Figure 1:
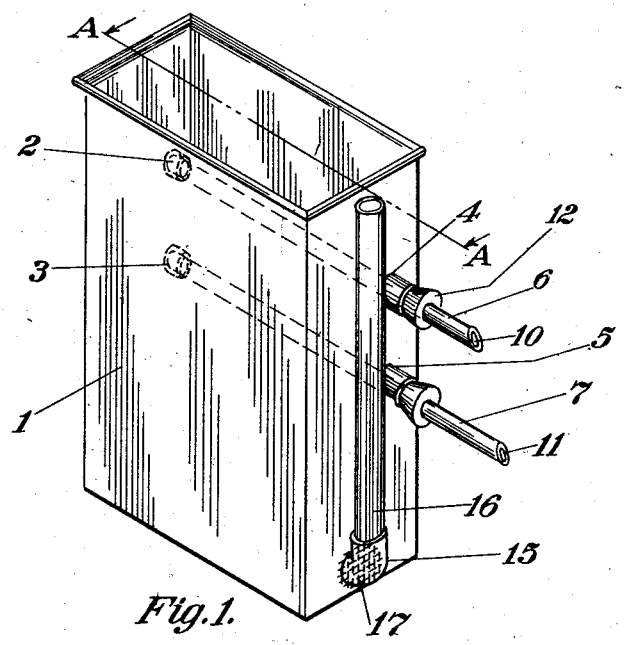

A. G. McCALL & A. B. GRAHAM.
APPARATUS FOR ILLUSTRATING DRAINAGE.
APPLICATION FILED JULY 14, 1911.

1,009,431.

Patented Nov. 21, 1911.

WITNESSES:
Robert Meiklejohn
Corda C. Smith

Arthur G. McCall
Albert B. Graham
INVENTORS

BY
Geo. W. Rightmire
ATTORNEY.

COLUMBIA PLANOGRAPH CO., WASHINGTON, D. C.

UNITED STATES PATENT OFFICE.

ARTHUR G. McCALL AND ALBERT B. GRAHAM, OF COLUMBUS, OHIO.

APPARATUS FOR ILLUSTRATING DRAINAGE.

1,009,431.  Specification of Letters Patent.  Patented Nov. 21, 1911.

Application filed July 14, 1911. Serial No. 638,574.

*To all whom it may concern:*

Be it known that we, ARTHUR G. MCCALL and ALBERT B. GRAHAM, citizens of the United States, residing at Columbus, in the county of Franklin and State of Ohio, have invented certain new and useful Improvements in Apparatus for Illustrating Drainage, of which the following is a specification.

Our invention relates to improvements in an apparatus for illustrating drainage and the principles of the retention of water by the soil or by compost or other substances, and the effect of the fall of additional water thereon, so far as outflow therefrom is concerned, the chief purposes being to show the function and operation of drain tile.

Our demonstrations have convinced us that there is much misunderstanding of the function of drain tile and the manner in which drainage is accomplished and, accordingly, our experience before gatherings of farmers and others interested in agriculture has made it clear that a demonstrating device for this purpose is of great utility. Accordingly, we have devised an apparatus for the above mentioned purposes and others hereinafter to be mentioned which is set forth in the drawings and will now be described.

Figure 2:
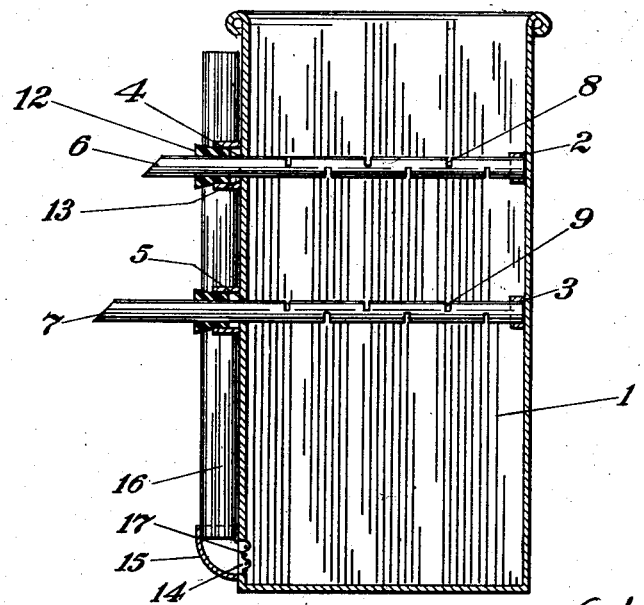

In the drawings which are hereto attached and hereby made a part of this specification, Figure 1 is a perspective view of the apparatus showing the tubes representing the tile in dotted lines; Fig. 2 is a vertical longitudinal section through the apparatus along the line A—A of Fig. 1.

Referring to the drawings, 1 is a receptacle which may be of any size desired, but which we have made so that it can be easily taken up and carried from place to place and packed for transportation, having the four sides and solid bottom as shown, the top being shown as open. Upon one of the inner faces are located the sockets 2 and 3 and opposite these respectively are openings 4 and 5 through the side of the receptacle. The tubes 6 and 7 are transversely slit as shown at 8 and 9, a series of slits being similarly formed on the lower side of the tubes, as illustrated in Fig. 2. These slits correspond to the openings or joints between the tiles the two successive slits on the same side representing two tile lengths. These tubes 6 and 7 are inserted through the openings 4 and 5 and positioned in the sockets 2 and 3 respectively, and the outer ends 10 and 11 are left open as shown in Fig. 1, so that any water contained in the receptacle may flow out upon entering the respective tubes. A rubber gasket 12 is placed on tube 6, and when the tube has been positioned in the socket 2, the gasket is forced into the socket 13, whereby the tube 6 is held in the position desired. A similar arrangement is shown with reference to tube 7.

An opening 14 is made in the side of the receptacle and a curved tube 15 is positioned thereover. Into this curved tube 15 fits a standpipe 16 at the side of the receptacle 1 which serves as a water gage. The entrance into the opening 14 is screened as shown at 17 to prevent the passage of solid particles into the gage or standpipe 16.

The parts being positioned and arranged, as shown in Figs. 1 and 2, the apparatus is ready for use and, accordingly, sand or soil is placed in the receptacle until the tubes are covered. it being understood that the soil or sand or whatever substance is used may be brought as close to the top of the receptacle as is desired. Water is then poured upon the soil in the receptacle and as it penetrates, very little, if any, will flow out through the tubes 6 and 7 but the water continues to penetrate until reaching the bottom of the receptacle, whereupon a water table will gradually be established, whereupon the soil being saturated, the free water will rise therein, the height of the surface thereof being shown in the gage or standpipe 16. When the gage shows that the water has risen to tube 7, water will begin to flow out of the end 11, and if the quantity of water entering the receptacle is increased sufficiently to bring the free water up to tube 6, water will then flow out of the opening 10 also. This experiment demonstrates clearly that water falling upon the surface of the earth penetrates the soil to an impervious layer or a permanent water table therein, represented here by the bottom of the receptacle, and its further descent being stopped, a body of water with a well defined surface or water table will be established, the position of this surface being represented by the height of the water in the gage 16. Now if into the soil there be placed one or more strings of tile, represented in our apparatus by the tubes 6 and 7, as the water table rises, drainage will take place through the lower string of tile; if the soil contains sufficient moisture to bring the water level up to the second string of tile, drainage will occur through that string also.

There is a well defined popular impression that the water falling upon the surface of the earth and penetrating the same will in large part enter and be carried away by the line of tile encountered in its descent, whereas our experiments conclusively show and our apparatus clearly demonstrates that it is not the descending water which is carried away by drainage systems, but it is the free water rising in the soil which enters the drainage tile and is carried away thereby. If, however, the water table is above the tile, drainage continues therethrough until the water table is brought below the tile. This demonstration makes it clear that in soils of various characters the drainage system must be placed below the surface at varying depths, having relation to the permeability of the sub-soil rather than to the surface of the soil. The depth at which tile is laid for drainage purposes is therefore shown to be not a matter of guess or accident, but a matter to be determined by the depth of the soil and its capacity for retention of water or moisture. This demonstration is of great value also in showing the action of water upon a heap of compost or manure; water falling upon the surface of such heap will in part flow off and in part penetrate, gradually going down to the bottom thereof and saturating the heap. When the saturation reaches a certain degree, free water will form and will gradually rise, the height of the water table being determined by the quantity of water that has penetrated the heap, the character of the heap itself, and the character of the earth beneath, as to its being porous or impervious. If enough water penetrates the heap, the water table will gradually rise to a point where the free water will begin to drain out through the sides of the heap; this water will carry with it in solution the concentrated soil foods, whereby the soil enriching quality of the heap is decreased. It is not the water falling upon the surface and running off directly which has caused the deterioration of the compost, but it is that which has penerated which has caused the loss. This makes it clear that the compost should be kept in a pit with an impervious bottom, and preferably the top should be covered to prevent the water falling thereon and leeching out the soil enriching qualities at the top and sides. The saturation of the lower part of the heap will work no injury provided the pit is deep enough and the bottom is practically impervious. The point to be impressed here is that the free water rising in the heap carries away the concentrated soil food unless a pit is provided of sufficient depth to prevent it. Moisture may reach the heap from sources other than falling water and in any view it is advisable that a pit be provided for this purpose. Other facts of importance to the agriculturist may be demonstrated by our apparatus, and we have called it an apparatus for illustrating drainage for the reason that we anticipate that to be its most extensive use, but we do not thereby limit its use to that one field of experiment. The apparatus, as shown and described herein, is made up of separable parts which are easily disconnected and packed within the receptacle itself for shipment and in course of experiment every one of the tubes may be withdrawn for illustrative purposes. The particular construction which we have shown and described is one embodiment of our idea, but we do not limit ourselves to that construction, but desire to have the advantage of all constructions falling within the scope of the appended claims.

What we claim is:

1. A demonstrating apparatus comprising a receptacle, a gage connected therewith, a tube having openings therein inserted in said receptacle and communicating with the exterior thereof, said receptacle being adapted to be filled with soil for purposes herein described.

2. A demonstrating apparatus comprising a receptacle, a gage mounted thereon, a plurality of perforated tubes detachably mounted in said receptacle and communicating with the exterior thereof, said receptacle being adapted to receive soil and water to illustrate the retention of water by the soil and drainage of the free water rising in the soil and the like.

3. A demonstrating apparatus comprising a receptacle having an opening near the bottom, a gage inserted in said opening outside of said receptacle, a perforated tube inserted in said receptacle communicating with the exterior thereof, said receptacle being adapted to be filled with soil for the purposes herein described.

4. In an apparatus for demonstrating drainage and the like a receptacle having an opening near its bottom, a gage placed therein on the outside of said receptacle, a removable perforated tube positioned in said receptacle, opening upon the exterior thereof, said receptacle being adapted to receive soil and water for the purposes herein set forth.

5. In an apparatus for demonstrating drainage and the like, a receptacle having an opening near its bottom, a gage arranged in said opening, a plurality of removable perforated tubes arranged transversely in said receptacle and opening on the exterior thereof, said receptacle being adapted to receive soil and water to illustrate the retention of water by the soil and drainage of the water rising through the soil, as herein set forth.

In testimony whereof we affix our signatures in the presence of two witnesses.

ARTHUR G. McCALL.
ALBERT B. GRAHAM.

Witnesses:
KARL D. McMAHON,
CARL E. AVIL.

Copies of this patent may be obtained for five cents each, by addressing the "Commissioner of Patents, Washington, D. C."